(12) United States Patent
Arunasalam et al.

(10) Patent No.: US 9,970,572 B2
(45) Date of Patent: May 15, 2018

(54) MICRO-ELECTRIC MECHANICAL SYSTEM CONTROL VALVE AND METHOD FOR CONTROLLING A SENSITIVE FLUID

(71) Applicant: DunAn Microstaq, Inc., Austin, TX (US)

(72) Inventors: Parthiban Arunasalam, Austin, TX (US); E. Nelson Fuller, Manchester, MI (US); Joe A. Ojeda, Sr., Austin, TX (US)

(73) Assignee: DUNAN MICROSTAQ, INC., Austin, TX (US)

( * ) Notice: Subject to any disclaimer, the term of this patent is extended or adjusted under 35 U.S.C. 154(b) by 162 days.

(21) Appl. No.: 14/919,953

(22) Filed: Oct. 22, 2015

(65) Prior Publication Data

US 2016/0123498 A1   May 5, 2016

Related U.S. Application Data

(60) Provisional application No. 62/072,508, filed on Oct. 30, 2014.

(51) Int. Cl.
*F16K 31/126* (2006.01)
*F16K 99/00* (2006.01)

(52) U.S. Cl.
CPC ........ *F16K 99/0059* (2013.01); *F16K 31/126* (2013.01); *F16K 99/0042* (2013.01)

(58) Field of Classification Search
CPC .. F16K 31/126; F16K 31/1268; F16K 31/128; F16K 99/0042; F16K 99/0059

USPC ............................... 251/30.01, 30.02, 30.05
See application file for complete search history.

(56) References Cited

U.S. PATENT DOCUMENTS

| | | | | |
|---|---|---|---|---|
| 1,798,973 | A * | 3/1931 | Cordier | F16K 31/40 251/30.01 |
| 2,754,840 | A * | 7/1956 | Hicks, Jr. | F15B 13/02 137/270 |
| 3,253,615 | A * | 5/1966 | Armstrong | F16K 31/406 137/599.14 |
| 3,519,022 | A * | 7/1970 | Chung | F16K 31/3835 137/625.2 |
| 4,360,037 | A * | 11/1982 | Kendall | B01D 25/38 137/242 |
| 4,785,851 | A * | 11/1988 | Peacock | F16K 51/02 251/30.02 |
| 5,238,223 | A * | 8/1993 | Mettner | F15C 5/00 251/129.06 |
| 5,853,018 | A * | 12/1998 | DeLand | F16K 47/00 123/458 |

(Continued)

*Primary Examiner* — Michael R Reid
*Assistant Examiner* — Jonathan Waddy
(74) *Attorney, Agent, or Firm* — MacMillan, Sobanski & Todd, LLC

(57) ABSTRACT

A valve assembly is configured to regulate the flow of an isolated fluid therethrough and includes a first valve stage configured to control the flow of a first fluid through a first fluid circuit, and a second valve stage configured to control the flow of a second fluid through a second fluid circuit. The first valve stage is connected to the second valve stage such that the first fluid acts on the second valve stage to move the second valve stage between open and closed positions. The second fluid flowing through the second valve stage is also isolated from the first fluid flowing through the first valve stage.

9 Claims, 7 Drawing Sheets

(56) References Cited

U.S. PATENT DOCUMENTS

| | | | | |
|---|---|---|---|---|
| 5,921,261 A * | 7/1999 | Erickson | ............... | F16L 55/052 137/1 |
| 6,024,114 A * | 2/2000 | Thomas | ............... | B60T 17/004 137/244 |
| 6,089,532 A * | 7/2000 | Rohloff | ............... | F16K 7/17 251/61.2 |
| 6,142,442 A * | 11/2000 | Carroll | ............... | B60T 13/665 251/30.02 |
| 6,390,782 B1 * | 5/2002 | Booth | ............... | F04B 27/1804 417/222.2 |
| 7,210,502 B2 | 5/2007 | Fuller et al. | | |
| 7,803,281 B2 | 9/2010 | Davies | | |
| 8,011,388 B2 | 9/2011 | Fuller et al. | | |
| 8,113,482 B2 | 2/2012 | Hunnicutt | | |
| 8,156,962 B2 | 4/2012 | Luckevich | | |
| 8,622,468 B2 | 1/2014 | Masuda et al. | | |
| 2002/0124897 A1 * | 9/2002 | Bergh | ............... | F15C 5/00 137/885 |
| 2006/0197041 A1 * | 9/2006 | Szymaszek | ............... | F16K 31/122 251/30.02 |
| 2007/0172362 A1 | 7/2007 | Fuller et al. | | |
| 2007/0178529 A1 * | 8/2007 | Breidford | ............... | B01F 11/04 435/7.1 |
| 2007/0251586 A1 | 11/2007 | Fuller et al. | | |
| 2008/0042084 A1 | 2/2008 | Fuller | | |
| 2009/0123300 A1 | 5/2009 | Uibel | | |
| 2009/0272442 A1 * | 11/2009 | Fishwick | ............... | F15B 13/0405 137/487.5 |
| 2010/0008401 A1 | 1/2010 | Beaulieu | | |
| 2010/0012195 A1 | 1/2010 | Hunnicutt | | |
| 2011/0127455 A1 | 6/2011 | Hunnicutt | | |
| 2012/0000550 A1 | 1/2012 | Hunnicutt et al. | | |
| 2012/0140416 A1 | 6/2012 | Price et al. | | |
| 2012/0145252 A1 | 6/2012 | Hunnicutt | | |
| 2012/0241012 A1 * | 9/2012 | Studer | ............... | F15B 13/0426 137/1 |
| 2012/0295371 A1 | 11/2012 | Arunasalam | | |
| 2012/0299129 A1 | 11/2012 | Arunasalam | | |
| 2014/0373937 A1 | 12/2014 | Fuller et al. | | |
| 2015/0153081 A1 * | 6/2015 | Gurley | ............... | F25B 41/062 137/106 |

\* cited by examiner

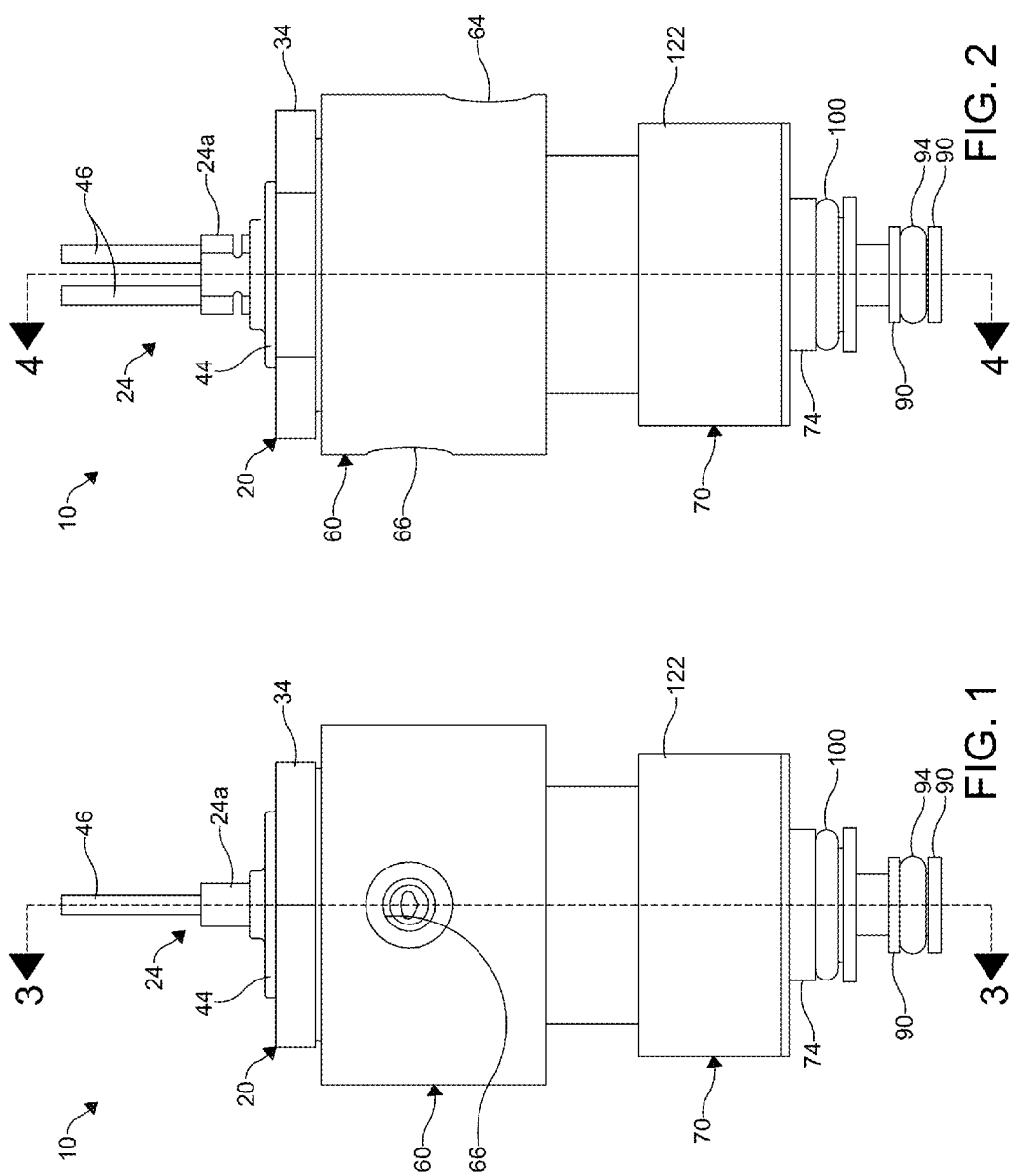

ns of a page.

MICRO-ELECTRIC MECHANICAL SYSTEM CONTROL VALVE AND METHOD FOR CONTROLLING A SENSITIVE FLUID

CROSS-REFERENCE TO RELATED APPLICATIONS

This application claims the benefit of U.S. Provisional Application No. 62/072,508, filed Oct. 30, 2014, the disclosure of which is incorporated herein by reference.

BACKGROUND OF THE INVENTION

This invention relates in general to microvalves of the general type described and illustrated in U.S. Pat. Nos. 7,210,502, 7,803,281, 8,011,388, 8,113,482, and 8,156,962 and in U.S. Published Patent Application Nos. 2007/0172362, 2007/0251586, 2008/0042084, 2009/0123300, 2010/0012195, 2010/0084031, 2011/0127455, 2012/0000550, 2012/0145252, 2012/0140416, 2012/0295371, and 2012/0299129. The disclosures of all of these patents and patent applications are incorporated herein by reference. In particular, this invention relates to a valve assembly including such a microvalve that is used as a first stage to control the operation of a second stage valve for regulating the flow of an isolated fluid therethrough.

MEMS (micro electro mechanical systems) are a class of systems that are physically small, having some features or clearances with sizes in the micrometer range or smaller (i.e., smaller than about 10 microns). These systems have both electrical and mechanical components. The term "micro machining" is commonly understood to mean the production of three-dimensional structures and moving parts of MEMS devices. MEMS originally used modified integrated circuit (e.g., computer chip) fabrication techniques (such as chemical etching) and materials (such as silicon semiconductor material) to micro machine these very small mechanical devices. Today there are many more micro machining techniques and materials available.

The term "MEMS device" as may be used in this application means a device that includes a micro machined component having some features or clearances with sizes in the micrometer range, or smaller (i.e., smaller than about 10 microns). It should be noted that if components other than the micro machined component are included in the MEMS device, these other components may be micro machined components or standard sized (i.e., larger) components.

Similarly, the term "microvalve" as may be used in this application means a valve having features or clearances with sizes in the micrometer range, or smaller (i.e., smaller than about 10 microns) and thus by definition is at least partially formed by micro machining. The term "microvalve device" as may be used herein means a device that includes a microvalve, and that may include other components. It should be noted that if components other than a microvalve are included in the microvalve device, these other components may be micro machined components or standard sized (i.e., larger) components.

The term "MEMS package" as used herein should be understood to mean a device, which includes a micromachined component and may include other components that may be micromachined components or standard sized components. A "MEMS fluidic package" should be understood to be a MEMS package including a fluid passageway. A "MEMS electrofluidic package" as used herein should be understood to be a MEMS package including a fluid passageway and an electrically active component that may be a micromachined component. A "MEMS package platform" as used herein should be understood to be an interface component or assembly of components upon which a MEMS device may be mounted and by means of which the MEMS device can be interfaced with an external system.

Microvalves of this general type have been successfully used to control the flow of various fluids therethrough. However, it has been found difficult to use microvalves of this general type to control the flow of certain other fluids therethrough. Thus, it would be desirable to provide an improved structure for such a microvalve that is used as a first stage to control the operation of a second stage valve for regulating the flow of an isolated fluid therethrough.

SUMMARY OF THE INVENTION

This invention relates to an improved valve assembly including a microvalve that is used as a first stage to control the operation of a second stage valve for regulating the flow of an isolated fluid through the valve assembly. The improved valve assembly is configured to regulate the flow of an isolated fluid therethrough and includes a first valve stage configured to control the flow of a first fluid through a first fluid circuit, and a second valve stage configured to control the flow of a second fluid through a second fluid circuit. The first valve stage is connected to the second valve stage such that the first fluid acts on the second valve stage to move the second valve stage between open and closed positions. The second fluid flowing through the second valve stage is also isolated from the first fluid flowing through the first valve stage.

Various aspects of this invention will become apparent to those skilled in the art from the following detailed description of the preferred embodiment, when read in light of the accompanying drawings.

BRIEF DESCRIPTION OF THE DRAWINGS

FIG. 1 is an elevational view of a valve assembly for regulating the flow of an isolated fluid therethrough in accordance with this invention.

FIG. 2 is an alternate elevational view of the valve assembly for regulating the flow of an isolated fluid illustrated in FIG. 1.

DETAILED DESCRIPTION OF THE PREFERRED EMBODIMENT

Figure 3:
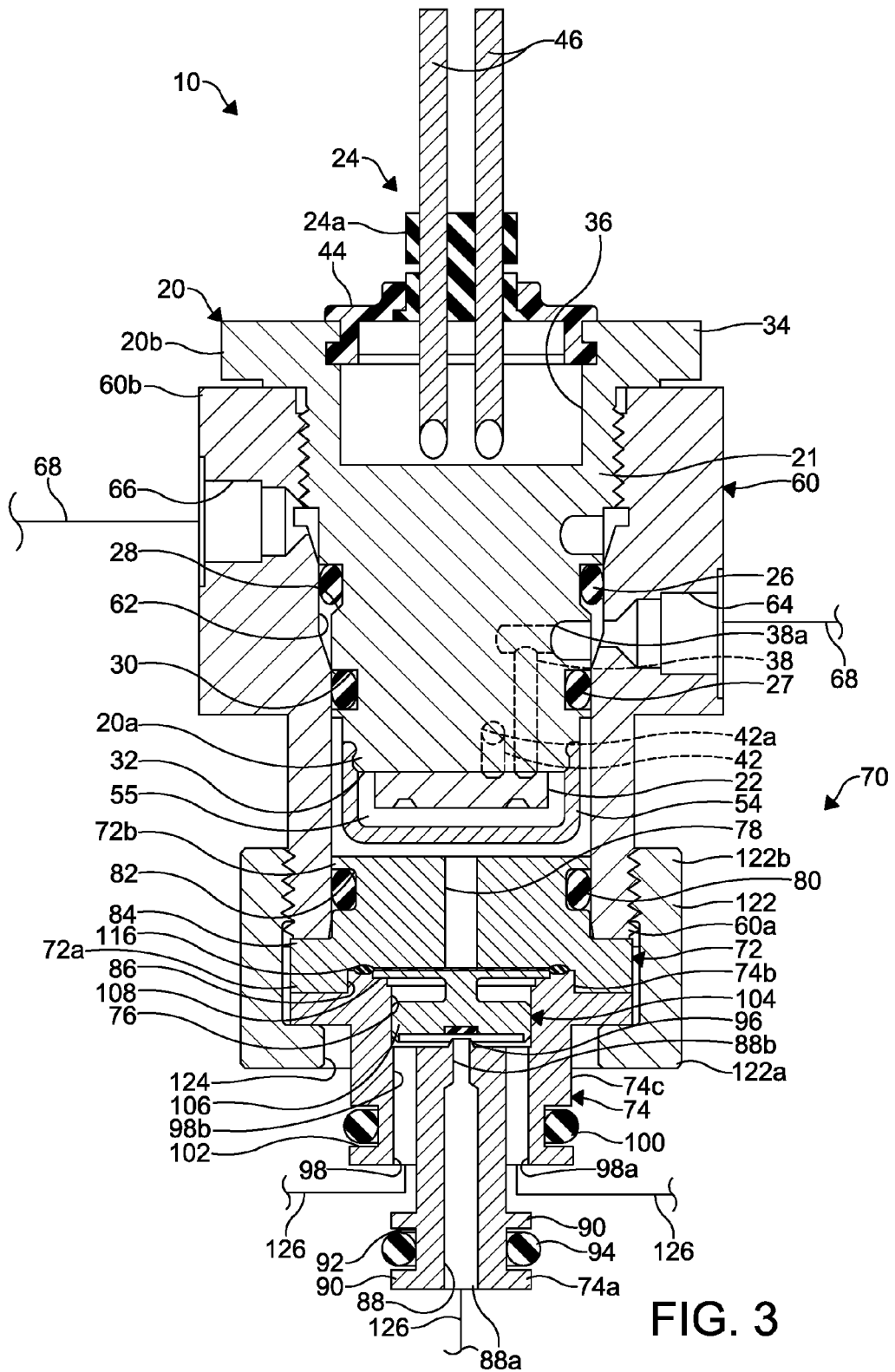
FIG. 3 is a sectional elevational view taken along the line 3-3 in FIG. 1.
Figure 4:
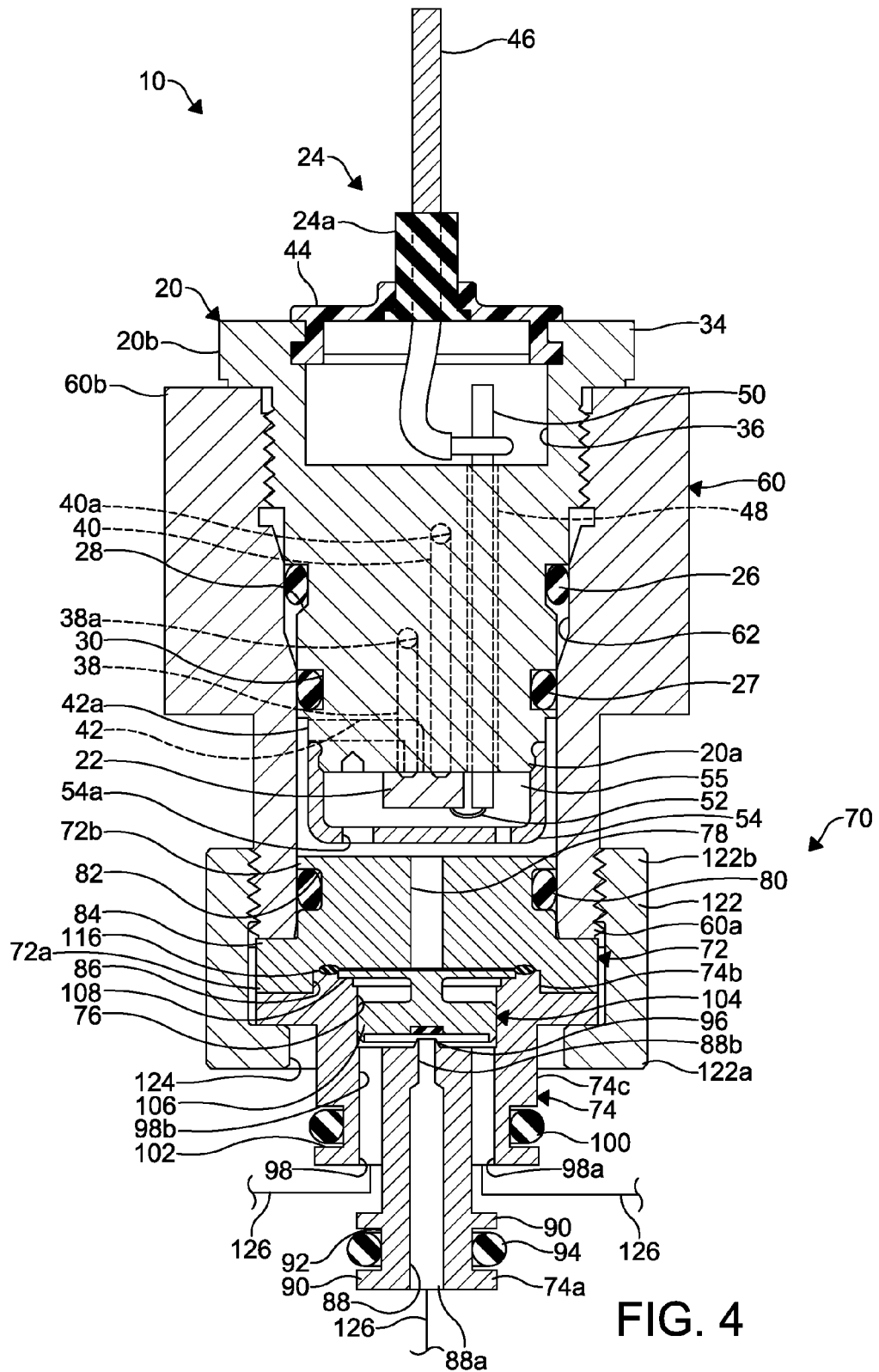
FIG. 4 is a sectional elevational view taken along the line 4-4 in FIG. 2.
Figure 5:
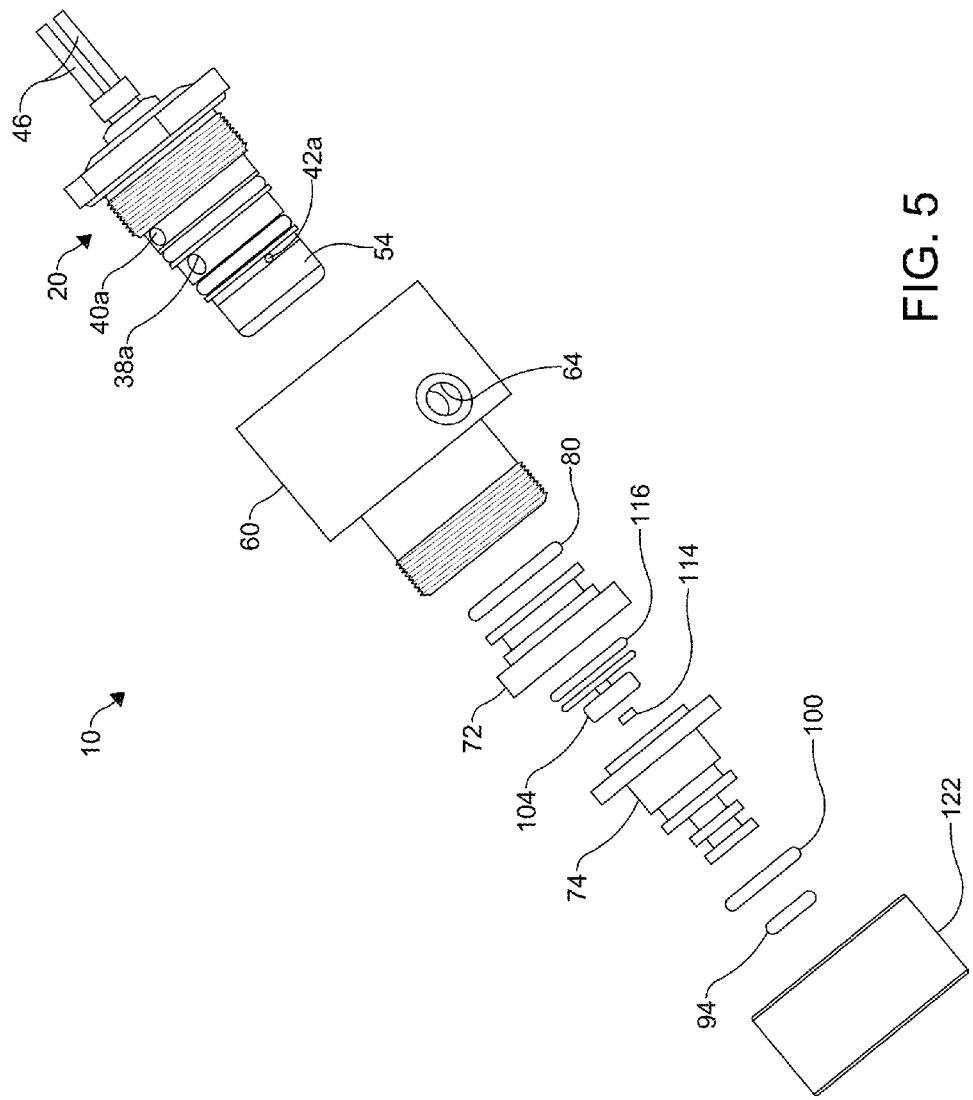
FIG. 5 is an exploded sectional elevational view of the valve assembly illustrated in FIGS. 1 through 4.
Figure 6:
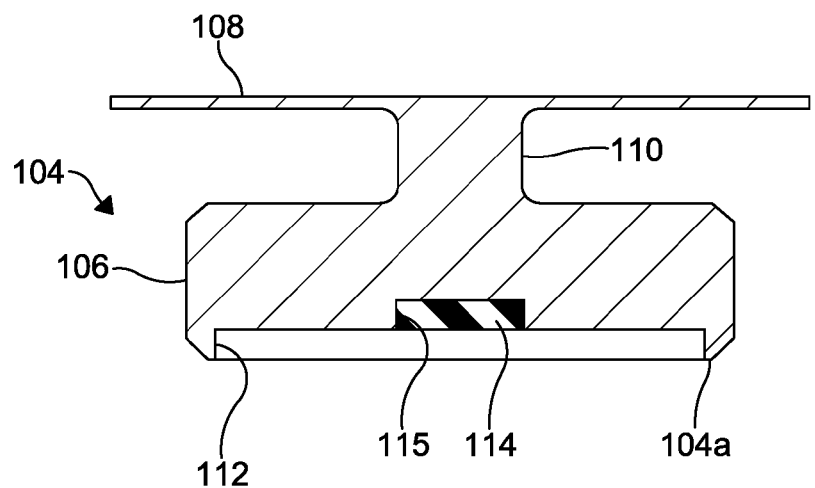
FIG. 6 is an enlarged sectional view of the piston illustrated in FIGS. 3 and 4.
Figure 7:
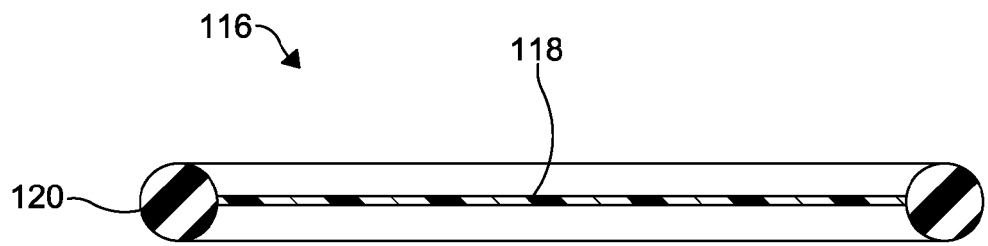
FIG. 7 is an enlarged sectional view of the diaphragm illustrated in FIGS. 3 and 4.

Referring now to the drawings, there is illustrated in FIGS. 1 through 5 a valve assembly, indicated generally at 10, for regulating the flow of an isolated fluid therethrough in accordance with this invention. The valve assembly 10 includes a first valve stage 20, a connecting body 60, and a second valve stage 70. The first valve stage 20 includes a MEMS module 21 having a microvalve 22 or other MEMS device supported thereon. As best shown in FIGS. 3 and 4, the first valve stage 20 and the second valve stage 70 are supported on the connecting body 60 to form the valve assembly 10.

The first valve stage 20 has a first end 20a and a second end 20b, and has a substantially cylindrical shape. An electrical connector 24 extends outwardly from the second end 20b of the first valve stage 20. A first O-ring 26 is mounted in a first circumferential groove 28 formed in an outside surface of the first valve stage 20, and a second O-ring 27 is mounted in a second circumferential groove 30 formed in a portion of the outside surface of the first valve stage 20.

The first end 20a of the first valve stage 20 defines a manifold 32, and the second end 20b includes a circumferentially extending flange 34 and has a substantially cylindrical cavity 36 formed therein. The microvalve 22 is mounted to the manifold 32 by any suitable method such as with solder A first fluid passageway 38 extends radially from a first opening 38a formed in the outside surface of the first valve stage 20 and continues longitudinally to a first fluid port of the microvalve 22. A second fluid passageway 40, best shown in FIG. 4, extends radially from a second opening 40a formed in the outside surface of the first valve stage 20 and continues longitudinally to a second fluid port of the microvalve 22. A third fluid passageway 42 extends radially from a third opening 42a formed in the outside surface of the first valve stage 20 and continues longitudinally to a third fluid port of the microvalve 22.

A mounting ring 44 for the electrical connector 24, such as a conventional pig-tail connector, is mounted within the cavity 36 in the second end 20b of the first valve stage 20. The mounting ring 44 may be mounted within the cavity 36 in the second end 20b of the first valve stage 20 by any desired means, such as in a snap fit arrangement or by a threaded connection. The electrical connector 24 includes a connector body 24a and electrical wires 46 extending therefrom. The electrical wires 46 connect the first valve stage 20 to a source of electrical power (not shown).

One or more longitudinally extending electrical passageways 48 are formed through the first valve stage 20 between the cavity 36 and the manifold 32. The electrical passageways 48 are configured to receive electrical wires 50. Connecting electrical wires 52 extend between wire bond pads on the microvalve 22 and the electrical wires 50. The electrical wires 46 are also connected to the electrical wires 50.

A generally cup-shaped cap 54 is attached to an outside surface of the first valve stage 20 at the first end 20a thereof. The cap 54 includes at least one opening 54a defining a flow path for fluid moving through the first valve stage 20. An interior of the cap 54 defines a cavity 55 within which the microvalve 22 is mounted. The cap 54 may be mounted to the first end 20a of the first valve stage 20 by any desired means, such by crimping or with a threaded connection. The illustrated first valve stage 20 and the cap 54 are preferably formed from steel. Alternatively, the first valve stage 20 and the cap 54 may be formed from any desired metal, composite, or other material.

The first, second, and third ports of the microvalve 22, described in detail below, may be formed in a manner that is well known in the art and allow fluid to flow into and out of the microvalve 22. In the illustrated embodiment, the first port of the microvalve 22 is configured as a normally closed port, the second port of the microvalve 22 is configured as a normally open port, and the third port of the microvalve 22 is configured as a common port. Alternatively, the first port of the microvalve 22 may be configured as the normally open port, and the second port of the microvalve 22 may be configured as the normally closed port.

The connecting body 60 has a first end 60a and a second end 60b, and has a substantially cylindrical shape defining a longitudinally extending cavity 62 therein. A first fluid port 64 and a second fluid port 66 are formed through the connecting body 60. As shown in FIGS. 1 through 4, the first valve stage 20 is mounted within the cavity 62 at the second end 60b of the connecting body 60. The cavity 62 defines a fluid flow path between the first valve stage 20 and the second valve stage 70, described below. The first valve stage 20 may be mounted within the cavity 62 in the connecting body 60 by any desired means, such by a threaded connection.

When supported on the connecting body 60, as best shown in FIGS. 3 and 4, the first valve stage 20 can control the flow of a first fluid between the first fluid port 64 and the second fluid port 66. The first fluid port 64 and the second fluid port 66 communicate with respective portions of a first fluid circuit, schematically illustrated at 68. In a known manner (such as described in the patents and patent applications referenced above), the first valve stage 20 can control the flow of a first fluid through the first fluid circuit 68, for a purpose that will be explained below. The illustrated connecting body 60 is preferably formed from aluminum. Alternatively, the connecting body 60 may be formed from any desired metal, composite, or other material. The first fluid may be a pressurized gas, such as nitrogen or air. Alternatively, the first fluid may be any other desired fluid.

The second valve stage 70 includes a diaphragm housing 72 that, as best shown in FIGS. 3 and 4, is supported on and cooperates with a valve seat body 74 to define an internal chamber 76. The diaphragm housing 72 has a first end 72a and a second end 72b, and has a substantially cylindrical shape defining a longitudinally extending passageway 78 therein. The second end 72b of the diaphragm housing 72 is mounted within the cavity 62 at the first end 60a of the connecting body 60. A third O-ring 80 or similar sealing structure may be provided between the diaphragm housing 72 and the cavity 62 of the connecting body 60. In the illustrated embodiment, the third O-ring 80 is mounted within a third circumferential groove 82 formed in an outside surface at the second end 72b of the diaphragm housing 72. The first end 72a of the diaphragm housing 72 includes a circumferentially extending flange 84 and has a substantially cylindrical cavity 86 formed therein.

The valve seat body 74 has a first end 74a and a second end 74b, and has a substantially cylindrical shape defining a longitudinally extending passageway 88 therein. A first end of the passageway defines a second fluid inlet 88a. The first end 74a of the valve seat body 74 has a first outside diameter and the second end 74b has a second outside diameter larger than the first outside diameter. A central portion 74c of the valve seat body 74 has a third outside diameter intermediate the first and second outside diameters. The first end 74a of the valve seat body 74 includes two parallel circumferentially extending flanges 90 that define a fourth circumferential groove 92. A fourth O-ring 94 or similar sealing structure may be provided in the fourth circumferential groove 92.

The second end of the valve seat body 74 includes a substantially cylindrical cavity defining the internal chamber 76, and is mounted within the cavity 86 in the first end 72a of the diaphragm housing 72. An annular valve seat 96 is formed on bottom surface of the chamber 76 about a second end 88b of the longitudinally extending passageway 88. An annular passageway 98 is formed in the valve seat body 74 and extends longitudinally from a first end that defines a second fluid outlet 98a to a second end 98b that opens into the chamber 76. A fifth O-ring 100 or similar sealing structure may be provided within a fifth circumferential groove 102 formed in an outside surface of the central portion 74c of the valve seat body 74.

A piston 104 defines a valve closing element and is disposed within the chamber 76 for sliding movement relative to the diaphragm housing 72 and the valve seat body 74. The piston 104 includes a substantially cylindrical piston body 106 connected to a disc-shaped spring element 108 by a longitudinally extending connecting member or rod 110. A substantially cylindrical cavity 112 is formed in a first surface 104a of the piston 104 (the downwardly facing surface when viewing FIGS. 3 and 4). A disc-shaped resilient seal 114 is mounted within a seal cavity 115 formed in a surface of the cavity 112. An outboard edge portion of the spring element 108 is retained between the diaphragm housing 72 and the valve seat body 74 within the cavity 86.

A diaphragm 116 includes a diaphragm body 118 mounted within a circumferential seal 120. The circumferential seal 120 of the diaphragm 116 is retained between the diaphragm housing 72 and the spring element 108 within the cavity 86. The diaphragm 116 is thus positioned between the first fluid circuit 68 and the spring element 108 of the piston 104, and defines a fluid-tight barrier between the first fluid in the first fluid circuit 68 and the second fluid in the second fluid circuit 126. The illustrated diaphragm body 118 is preferably formed from EPDM rubber, such that the diaphragm body is movable in response to an applied force, such as from pressurized fluid as described below. Alternatively, the diaphragm body 118 may be formed from other natural or synthetic elastomers, a polyimide film such as Kapton®, or from any desired resilient material.

A retainer 122 is substantially cup-shaped and has a first end 122a and a second end 122b. The second end 122b is attached to an outside surface of the connecting body 60 at the first end 60a thereof. The retainer 122 includes at an opening 124 in the first end 122a through which a portion of the valve seat body 74 extends. The retainer 122 may be mounted to the first end 60a of the connecting body 60 by any desired means, such by crimping or with a threaded connection as illustrated. The illustrated diaphragm housing 72, the valve seat body 74 piston 104, and the retainer 122 are preferably formed from steel. Alternatively, the diaphragm housing 72, the valve seat body 74 piston 104, and the retainer 122 may be formed from any desired metal, composite, or other material.

The second valve stage 70 can control the flow of a second fluid between the second fluid inlet 88a and the second fluid outlet 98a. The second fluid inlet 88a and the second fluid outlet 98a communicate with respective portions of a second fluid circuit, schematically illustrated at 126. As will be explained below, the first fluid circuit 68 can be used to control the operation of the second fluid circuit 126, thus allowing the MEMS module 21 and the microvalve 22 to control the flow of the second fluid through the second fluid circuit 126, while simultaneously isolating the MEMS module 21 and the microvalve 22 from the flow of the second fluid through the second fluid circuit 126.

The second valve stage 70 is movable between an open position, shown in FIGS. 3 and 4, and a closed position (not shown). In the open position, the piston 104 is spaced apart from the valve seat 96 and fluid is permitted to flow through the second valve stage 70 and therefore through the second fluid circuit 126. In the closed position, the seal 114 of the piston 104 is urged into contact with the valve seat 96, preventing fluid flow therethrough, therefore preventing fluid flow through the second fluid circuit 126.

The microvalve 22 may be powered by a battery (not shown) or other source of electrical power (not shown). The microvalve 22 may be actuated and controlled by any desired means, such as through suitable valve control electronics (not shown). For example, the control electronics may include a microcontroller (not shown) mounted at any desired location and electrically connected to the microvalve 22. The microcontroller may be used to control the volume of fluid flowing through the microvalve 22, and therefore controlling the fluid pressure within the passageway 78 and acting on the diaphragm 116.

The volume of the second fluid that moves through the second valve stage 70 may be an amount pre-determined and pre-programmed in the microcontroller, or may be an amount calculated by the microcontroller based on input from sensors (not shown) within the valve assembly 10, or in one or both of the first fluid circuit 68 and the second fluid circuit 126. Such sensors may include any desired sensors, such as temperature sensors, pressure sensors, and sensors configured to measure a volume or a duration of the flow of fluid through the first fluid circuit 68 and/or the second fluid circuit 126.

In operation, when the MEMS module 21 and the microvalve 22 are actuated, pressurized fluid in the cavity 62 at the second end 60b of the connecting body 60 is applied to the diaphragm 116 via the passageway 78.

When a pressure of the pressurized fluid in the cavity 62 and the passageway 78 is greater than a pre-set spring force of the spring element 108, the spring element 108 is deflected toward the valve seat 96 (downwardly when viewing FIGS. 3 and 4), and the seal 114 of the piston 104 is urged into contact with the valve seat 96, thus moving the second valve stage 70 to the closed position and preventing fluid flow through the second fluid circuit 126.

When the pressure of the pressurized fluid in the cavity 62 and the passageway 78 is reduced to a value less than the pre-set spring force of the spring element 108, the spring element 108 returns to an unactuated position (upwardly when viewing FIGS. 3 and 4), and the seal 114 of the piston 104 is moved away from the valve seat 96, thus moving the second valve stage 70 to the open position and allowing fluid flow through the second fluid circuit 126.

As a result, the diaphragm 116 effects movement of the piston 104 downward relative to the valve seat body 74. The relative position of the piston 104 within the valve seat body 74 controls the flow of the second fluid between the second fluid inlet 88a and the second fluid outlet 98a and, consequently, the flow of the second fluid through the second fluid circuit 126.

Fluid moving through an electronically actuated microvalve, such the microvalve 22, may be heated, including to a boiling temperature, by the actuator 214 of the microvalve 22, described below. It may be undesirable however, to boil or even slightly raise the temperature of some fluids, including biological fluids, such as blood and blood products. Advantageously, the improved valve assembly 10 allows the MEMS module 21 and the microvalve 22 to control the flow of the second fluid through the second fluid circuit 126, without undesirably heating the second fluid in the second fluid circuit 126.

As described above, various microvalve devices are known for controlling fluid flow within a fluid circuit. A typical microvalve device includes a displaceable member or valve component movably supported by a body for movement between a closed position and a fully open position. When placed in the closed position, the valve component substantially blocks or closes a first fluid port that is otherwise in fluid communication with a second fluid port, thereby substantially preventing fluid from flowing between the fluid ports. When the valve component moves from the closed position to the fully open position, fluid is increasingly allowed to flow between the fluid ports.

U.S. Pat. Nos. 6,523,560, 6,540,203, and 6,845,962, the disclosures of which are incorporated herein by reference, describe microvalves made of multiple layers of material. The multiple layers are micromachined and bonded together to form a microvalve body and the various microvalve components contained therein, including an intermediate mechanical layer containing the movable parts of the microvalve. The movable parts are formed by removing material from an intermediate mechanical layer (by known micromachined device fabrication techniques, such as, but not limited to, Deep Reactive Ion Etching) to create a movable valve element that remains attached to the rest of the part by a spring-like member. Typically, the material is removed by creating a pattern of slots through the material to achieve the desired shape. The movable valve element will then be able to move in one or more directions an amount roughly equal to the slot width.

One embodiment of a microvalve suitable for use with the invention is described in U.S. Published Patent Application No. 2014/0373937 to Fuller et al., the disclosure of which is incorporated in its entirety herein. For the sake of brevity, only those portions of U.S. Published Patent Application No. 2014/0373937 that are particularly relevant to the present invention will be discussed herein. It will be understood that other microvalves may also be used with the invention.

Figure 8:
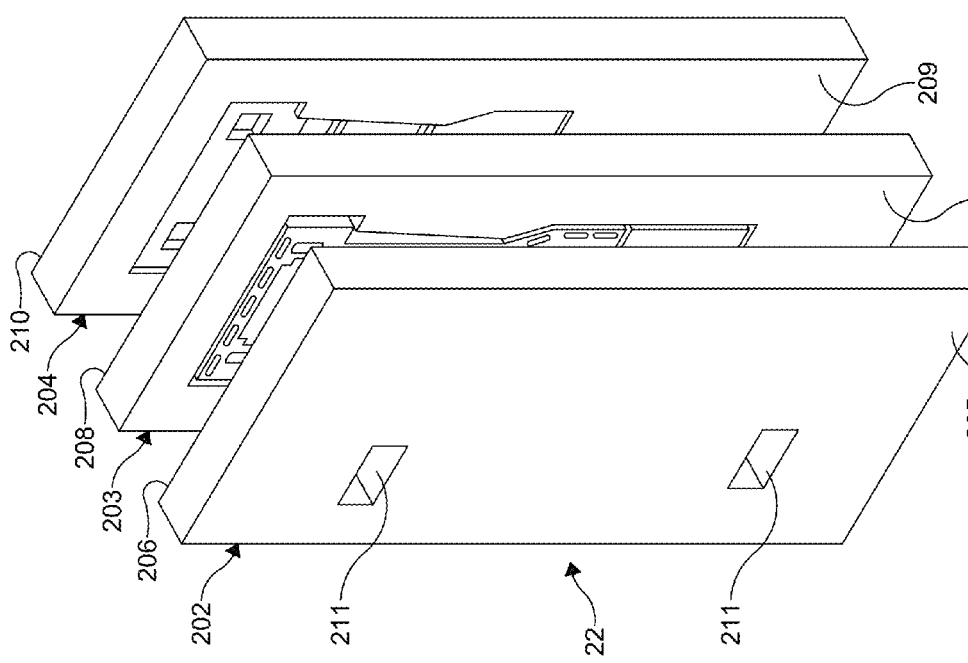
FIG. 8 is an exploded perspective view of a known microvalve having a cover plate, an intermediate plate, and a base plate.

FIG. 8 is an exploded perspective view of an exemplary embodiment of the microvalve 22. The microvalve 22 has a cover plate 202, an intermediate plate 203, and a base plate 204. The cover plate 202 has an outer surface 205 and an inner surface 206. The intermediate plate 203 has a first surface 207 and a second surface 208. The base plate 204 has an inner surface 209 and an outer surface 210. The cover plate 202, the intermediate plate 203, and the base plate 204 combine to define a body configured to support a valve element, described below. As described above in reference to known MEMS devices, and as described in U.S. Published Patent Application No. 2014/0373937, the disclosure of which has been incorporated in its entirety herein, the cover plate 202, the intermediate plate 203, and the base plate 204 may be composed of any desired material or combination of materials. For example, the cover plate 202, the intermediate plate 203, and the base plate 204 may be composed of silicon and/or similar materials.

Figure 9:
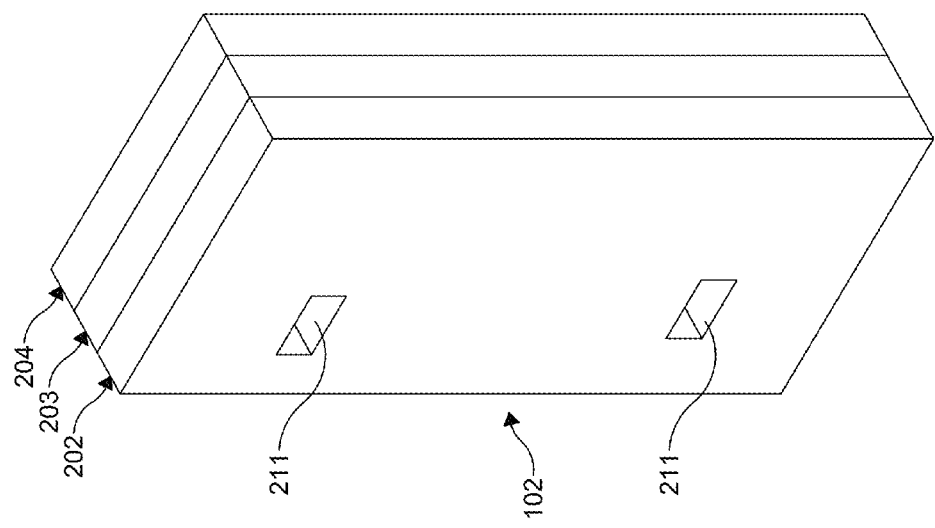
FIG. 9 is a perspective view of the known microvalve illustrated in FIG. 8 shown assembled.

FIG. 9 is a perspective view of the microvalve 22 illustrated in FIG. 8 shown assembled. Upon assembly of the microvalve 22, the inner surface 206 of the cover plate 202 engages the first surface 207 of the intermediate plate 203, while the inner surface 209 of the base plate 204 engages the second surface 208 of the intermediate plate 203.

The cover plate 202, the intermediate plate 203, and/or the base plate 204 of the microvalve 22 may be chemically and/or physically bonded together by any suitable method known to those of ordinary skill in the art, non-limiting examples of which include one or more types of mechanical fasteners and/or adhesives.

Figures 10, 11, 12:
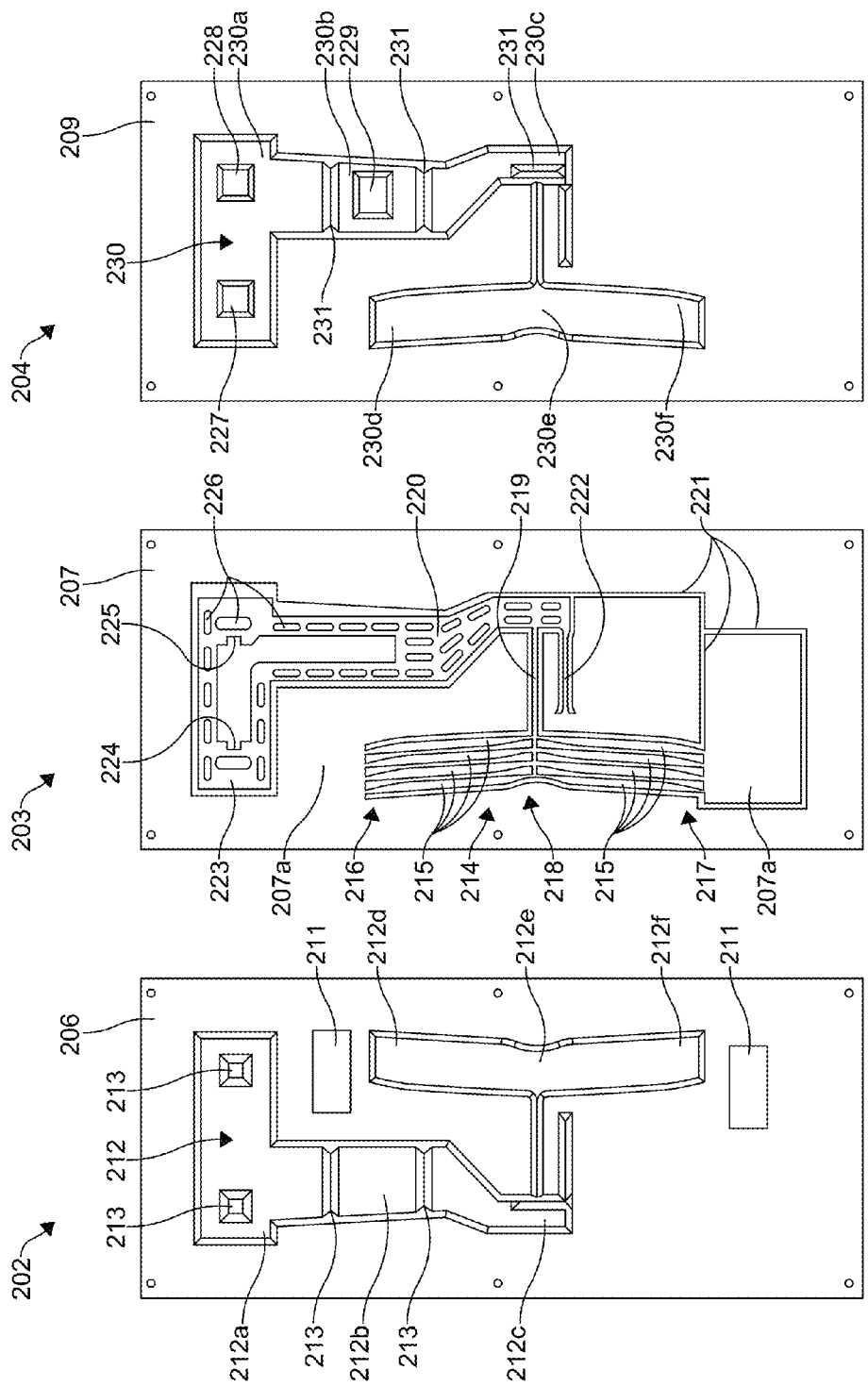
FIG. 10 is a top plan view of an inner surface of the cover plate illustrated in FIGS. 8 and 9.
FIG. 11 is a top plan view of the intermediate plate illustrated in FIGS. 8 and 9.
FIG. 12 is a top plan view of an inner surface of the base plate illustrated in FIGS. 8 and 9.

The inner surface 206 of the cover plate 202 is shown in FIG. 10. In the illustrated embodiment, the cover plate 202 includes electrical ports 211, the purpose of which is described below.

As shown in FIG. 10, the inner surface 206 of the cover plate 202 includes an actuator cavity 212 having one or more pressure equalization recesses or depressions 213 that reduce or prevent pressure imbalances during operation of the microvalve 22.

The actuator cavity 212 in the inner surface 206 of the cover plate 202 is located adjacent to, and has a shape corresponding to, an actuator 214 on the intermediate plate 203.

The illustrated actuator cavity 212 includes an upper actuator arm cavity region 212a, a central actuator arm cavity region 212b, a lower actuator arm cavity region 212c, a dead end rib cavity region 212d, a central rib cavity region 212e, and an open end rib cavity region 212f.

The electrical ports 211, the actuator cavity 212, and the one or more pressure equalization recesses 213 in the inner surface 206 of the cover plate 202 may be formed by any suitable process known to those of ordinary skill in the art, a non-limiting example of which includes an etching process.

As shown in FIG. 11, the actuator 214 includes a plurality of actuator ribs 215 having a dead end rib region 216, an open end rib region 217, and a central rib region 218 joined in a herringbone pattern to a moveable central spine 219, and a displaceable member having a displaceable actuator arm 220 operatively coupled to the spine 219. The intermediate plate 203 may also include one or more air flow passages 221 for purging air from the open end rib region 217 of the plurality of actuator ribs 215 and out of the microvalve 22.

The actuator arm 220, which is operatively coupled to the spine 219, includes a pivot anchor or hinge 222 that bends or flexes to accommodate movement of the actuator arm 220 as it is arcuately displaced between actuated and un-actuated positions by movement of the spine 219 of the actuator 214. The arcuate movement of the actuator arm 220 occurs in and defines a plane that is parallel to the first surface 207 in the regions where the first surface 207 contacts the cover plate 202 and/or a plane that is parallel to the second surface 208 in the regions where the second surface 208 contacts the base plate 204. The hinge 222 is formed in a pivot anchor region 40 defined between the spine 219 and an air flow passage 221. The actuator arm 220 also includes a valve element 223 having slots 224 and 225 for controlling the flow of a fluid through the microvalve 22, and a plurality of pressure equalization openings 226 for reducing or preventing pressure imbalances so as to minimize or prevent "out of plane" movement of the valve element 223 of the actuator arm 220 during actuation and un-actuation thereof.

The first surface 207 of the intermediate plate 203 may also include bond pads 207a arranged in bond pad regions which are located adjacent to the electrical ports 211 of the cover plate 202 when the microvalve 22 is assembled. Upon assembly of the microvalve 22, the bond pads 207a provide an electrical contact between electrical wires (not shown) bonded to the bond pads 207a and connected to a source of electrical power (not shown) and the plurality of actuator ribs 215 of the intermediate plate 203 for the purpose of passing an electrical current through the plurality of actuator ribs 215 during actuation or energization.

The inner surface 209 of the base plate 204 is shown in FIG. 12. In the illustrated embodiment, the inner surface 209 of the base plate 204 includes an actuator cavity 230 having one or more pressure equalization recessions or depressions 231 (e.g., troughs, receptacles) that diminish or prevent pressure imbalances during operation of the conventional microvalve device.

The actuator cavity 230 in the inner surface 209 of the base plate 204 may include an upper actuator arm cavity region 230a, a central actuator arm cavity region 230b, a lower actuator arm cavity region 230c, a dead end rib cavity region 230d, a central rib cavity region 230e, and an open end rib cavity region 230f. The base plate 204 further includes a plurality of fluid ports for permitting passage of fluid through the microvalve 22, including a normally open fluid port 227, a normally closed fluid port 228, and a common fluid port 229. It will be understood however, that each of the respective fluid ports may be configured to be either normally opened or normally closed in the absence or presence of an electrical current passing through the plurality of actuator ribs 215.

When the intermediate plate 203 is assembled with the base plate 204, and the actuator arm 220 and the valve element 223 of the actuator 214 have not been actuated, the normally open fluid port 227 is in an open position and the normally closed fluid port 228 is in a closed position. In the open position, the slot 224 is positioned such that it overlaps a portion of the normally open fluid port 227, thereby allowing fluid flow between the normally open fluid port 227 and the common fluid port 229. When the normally closed fluid port 228 is in the closed position, the slot 225 is positioned away from the fluid port 228, thereby substantially preventing fluid flow between the fluid port 228 and the common fluid port 229.

During actuation of the microvalve 22, the ribs 215 are heated by passing an electrical current therethrough. The ribs 215 then undergo thermal expansion and elongate, which urges the spine 219 and the attached actuator arm 220 away from the ribs 215 (to the right when viewing FIG. 11). The actuator arm 220 then bends or flexes at the hinge 222 to accommodate movement of the spine 219 thereby causing the valve element 223, and its slots 224 and 225 to move in the plane of normal motion along an arcuate path (to the right when viewing FIG. 11) to a stressed position which closes the normally open fluid port 227 and opens the normally closed fluid port 228.

When the electrical current is removed from the ribs 215, the ribs 215 cool and contract, urging the central spine 219 back toward the ribs 215 (to the left when viewing FIG. 11). The actuator arm 220 and valve element 223 then return to the un-actuated position, wherein the normally open fluid port 227 is again open, and the normally closed fluid port 228 is again closed.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A valve assembly configured to regulate the flow of an isolated fluid therethrough, the valve assembly comprising:
a first valve stage having an electronically actuated microvalve and configured to control the flow of a first fluid through a first fluid circuit;
a second valve stage configured to control the flow of a second fluid through a second fluid circuit, the first valve stage connected to the second valve stage such that the first fluid acts on the second valve stage to move the second valve stage between open and closed positions; and
a connecting body, the first valve stage and the second valve stage are supported on the connecting body, the connecting body defining a fluid flow path between the first valve stage and the second valve stage;
wherein the electronically actuated microvalve is an electrically actuated micromachined sliding plate microvalve comprising:
  a first plate defining a first plane and including a surface, a recessed area provided within the surface, and a fluid port provided within the recessed area; and
  a second plate defining a second plane;
  wherein the second plate has a surface that faces the surface of the first plate and includes a displaceable member that is slidably movable relative to the first plate, the sliding movement of the displaceable member occurring within the second plane defined by the second plate and parallel to the first plane defined by the first plate;
  wherein the displaceable member is movable between a closed position and an opened position;
  wherein the displaceable member is attached by a spine to a plurality of actuator ribs that are formed integrally with the second plate for moving the displaceable member between the closed and opened positions, and the displaceable member comprises a valve element connected through a displaceable actuator arm to the spine and to a hinge on the second plate;
  wherein in the closed position of the displaceable member the valve element cooperates with the first plate to reduce fluid communication through the fluid port; and
  wherein in the opened position of the displaceable member, the valve element does not cooperate with at least a portion of the first plate to reduce fluid communication through the fluid port;
wherein the second fluid flowing through the second valve stage is isolated from the first fluid flowing through the first valve stage;
wherein the second valve stage includes a first end and a second end, a piston chamber formed at the second end of the second valve stage, and an annular valve seat formed in a wall of the piston chamber;
wherein a first fluid passageway extends from the first end of the second valve stage to the valve seat in the piston chamber and defines a fluid inlet;
wherein a piston defines a valve closing element and is slidably mounted in the piston chamber and movable between an open position wherein the second fluid is permitted to flow through the second valve stage, and a closed position wherein the second fluid is prevented from flowing through the second valve stage; and
wherein an annular passageway is formed in the second valve stage about the first fluid passageway and extends from a first end that defines a fluid outlet to a second end that opens into the piston chamber.

2. The valve assembly according to claim 1, wherein the first valve stage includes a first end and a second end, the first end of the first valve stage defining a manifold to which the microvalve is mounted.

3. The valve assembly according to claim 2, the first valve stage further including an electrical connector connected to the microvalve and extending outward of the first valve stage.

4. The valve assembly according to claim 3, further including a cap attached to the first end of the first valve stage, the cap defining a cavity within which the first microvalve is mounted.

5. The valve assembly according to claim 1, wherein the piston includes a piston body connected to a disc-shaped spring element by a connecting member, and wherein an outboard edge portion of the spring element is attached to the second valve stage.

6. The valve assembly according to claim 5, further including a resilient diaphragm attached to the second valve stage between the first fluid circuit and the spring element of the piston, the diaphragm defining a fluid-tight barrier between the first fluid in the first fluid circuit and the second fluid in the second fluid circuit.

7. The valve assembly according to claim 6, wherein when a pressure of the first fluid in the fluid flow path between the first valve stage and the second valve stage and acting against the diaphragm is greater than a spring force of the spring element, the spring element is deflected toward the valve seat, and the piston is urged into contact with the valve seat, thus moving the piston to the closed position and preventing fluid flow through the second fluid circuit, and wherein when the pressure of the first fluid in the fluid flow path between the first valve stage and the second valve stage and acting against the diaphragm is reduced to a value less than the spring force of the spring element, the spring element returns to an unactuated position, and the piston is moved away from the valve seat, thus moving the piston to the open position and allowing fluid flow through the second fluid circuit.

8. A method of regulating a flow of an isolated fluid through a valve assembly, the method comprising:
    moving a volume of a first fluid through a first valve stage of a first fluid circuit, wherein the first valve stage includes an electronically actuated microvalve;
    moving a volume of a second fluid through a second valve stage of a second fluid circuit, wherein the first valve stage is connected to the second valve stage, and wherein the second fluid flowing through the second valve stage is isolated from the first fluid flowing through the first valve stage; and
    controlling the flow of the first fluid against a movable member of the second valve stage such that the first fluid acts on the movable member to move the second valve stage between open and closed positions;
    wherein the electronically actuated microvalve is an electrically actuated micromachined sliding plate microvalve comprising:
        a first plate defining a first plane and including a surface, a recessed area provided within the surface, and a fluid port provided within the recessed area; and
        a second plate defining a second plane;
        wherein the second plate has a surface that faces the surface of the first plate and includes a displaceable member that is slidably movable relative to the first plate, the sliding movement of the displaceable member occurring within the second plane defined by the second plate and parallel to the first plane defined by the first plate;
        wherein the displaceable member is movable between a closed position and an opened position;
        wherein the displaceable member is attached by a spine to a plurality of actuator ribs that are formed integrally with the second plate for moving the displaceable member between the closed and opened positions, and the displaceable member comprises a valve element connected through a displaceable actuator arm to the spine and to a hinge on the second plate;
        wherein in the closed position of the displaceable member the valve element cooperates with the first plate to reduce fluid communication through the fluid port; and
        wherein in the opened position of the displaceable member, the valve element does not cooperate with at least a portion of the first plate to reduce fluid communication through the fluid port;
    wherein the first valve stage and the second valve stage are supported on a connecting body, the connecting body defining a fluid flow path between the first valve stage and the second valve stage, wherein the second valve stage includes a first end and a second end, a piston chamber formed at the second end of the second valve stage, and an annular valve seat formed in a wall of the piston chamber, wherein a first fluid passageway extends from the first end of the second valve stage to the valve seat in the piston chamber and defines a fluid inlet, wherein a piston defines a valve closing element and is slidably mounted in the piston chamber and movable between the open position wherein the second fluid is permitted to flow through the second valve stage, and the closed position wherein the second fluid is prevented from flowing through the second valve stage, wherein the piston includes a piston body connected to a disc-shaped spring element by a connecting member, wherein an outboard edge portion of the spring element is attached to the second valve stage, and wherein an annular passageway is formed in the second valve stage about the first fluid passageway and extends from a first end that defines a fluid outlet to a second end that opens into the piston chamber.

9. The method according to claim 8, wherein the movable member is a resilient diaphragm attached to the second valve stage between the first fluid circuit and the spring element of the piston, the diaphragm defining a fluid-tight barrier between the first fluid in the first fluid circuit and the second fluid in the second fluid circuit, wherein when a pressure of the first fluid in the fluid flow path between the first valve stage and the second valve stage and acting against the diaphragm is greater than a spring force of the spring element, the spring element is deflected toward the valve seat, and the piston is urged into contact with the valve seat, thus moving the piston to the closed position and preventing fluid flow through the second fluid circuit, and wherein when the pressure of the first fluid in the fluid flow path between the first valve stage and the second valve stage and acting against the diaphragm is reduced to a value less than the spring force of the spring element, the spring element returns to an unactuated position, and the piston is moved away from the valve seat, thus moving the piston to the open position and allowing fluid flow through the second fluid circuit.

* * * * *